Nov. 1, 1960 L. C. MAIER, JR., ET AL 2,958,735

VIDEO TAPE RECORDING SYSTEM

Filed Feb. 24, 1956 3 Sheets-Sheet 1

INVENTORS:
LEONARD C. MAIER, JR.
JAMES E. KEISTER,
BURTON R. LESTER,
BENJAMIN G. WALKER,

BY Nathan [signature]

THEIR ATTORNEY.

Nov. 1, 1960 L. C. MAIER, JR., ET AL 2,958,735

VIDEO TAPE RECORDING SYSTEM

Filed Feb. 24, 1956 3 Sheets-Sheet 2

INVENTORS:
LEONARD C. MAIER, JR,
JAMES E. KEISTER,
BURTON R. LESTER,
BENJAMIN G. WALKER,

BY Nathan J. Kornfeld
THEIR ATTORNEY.

VIDEO TAPE RECORDING SYSTEM

Filed Feb. 24, 1956 3 Sheets-Sheet 3

INVENTORS:
LEONARD C. MAIER, JR.
JAMES E. KEISTER,
BURTON R. LESTER,
BENJAMIN G. WALKER,
BY Nathan [signature]
THEIR ATTORNEY.

United States Patent Office 2,958,735

Patented Nov. 1, 1960

2,958,735

VIDEO TAPE RECORDING SYSTEM

Leonard C. Maier, Jr., De Witt, James E. Keister and Burton R. Lester, Baldwinsville, and Benjamin G. Walker, North Syracuse, N.Y., assignors to General Electric Company, a corporation of New York Filed Feb. 24, 1956, Ser. No. 567,581

1 Claim. (Cl. 179—100.2)

The present invention relates to a recording and reproducing system for signals having frequency components which extend over a broad band, such as television video signals.

One object of the invention is to provide a method and apparatus for recording and reproducing broad band signals with good fidelity and signal-to-noise ratio, and without exceeding readily attainable storage medium scanning speeds.

Another object is to provide a system for recording broad band signals which utilizes a plurality of parallel signal storage tracks or channels and wherein the number of such channels required for a given signal band width is a minimum.

Another object is to provide a magnetic tape video recording system employing time sample multiplexing and wherein cross talk or interference between components of the multiplexed signal is minimized.

These and other objects of the invention will be apparent from the following description, and the scope of the invention will be defined in the appended claims.

Figure 1:
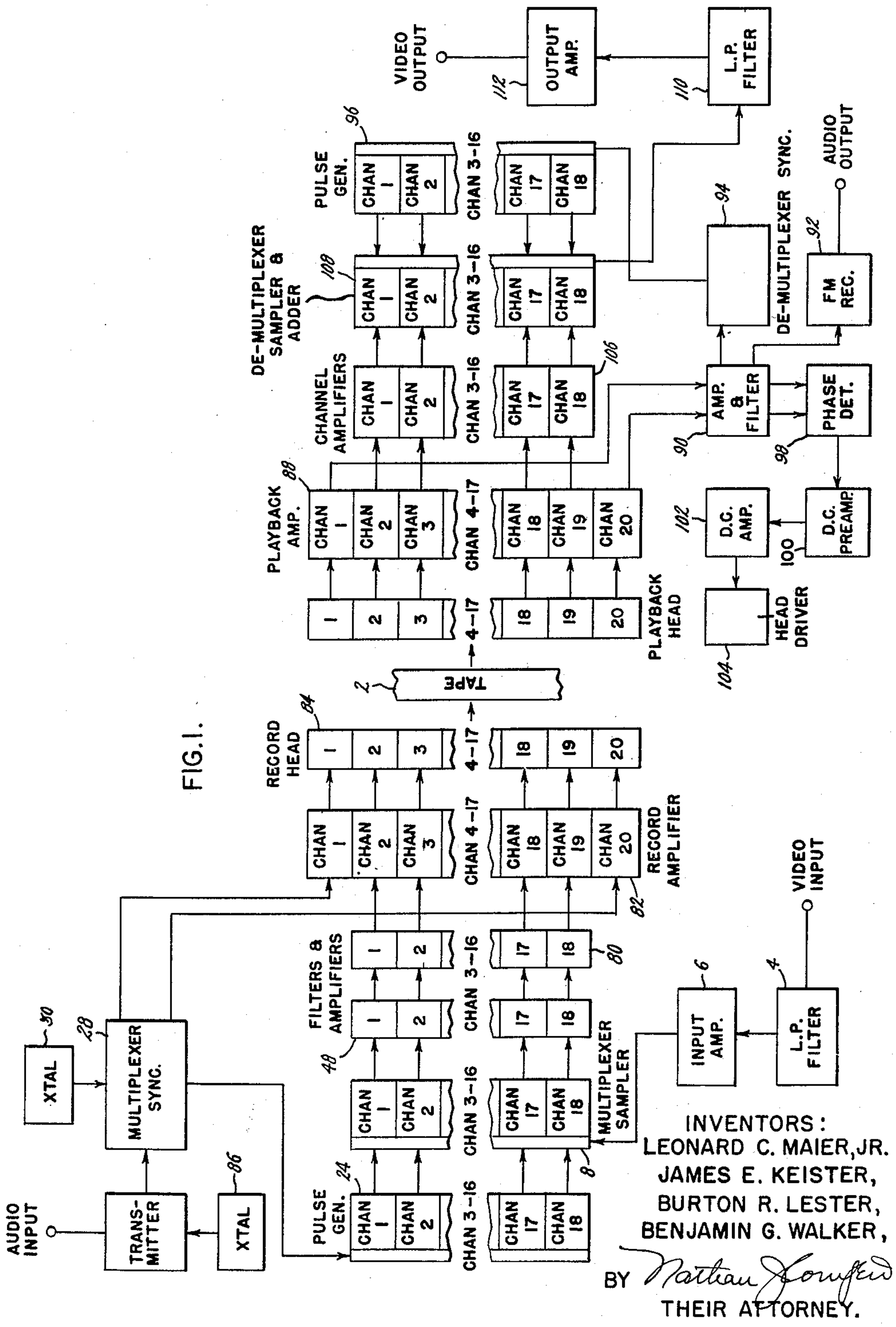
Figure 1 is a block diagram of a wide band recording and reproducing system constructed in accordance with the present invention.

Briefly, the recording and reproducing system of the present invention is a time sample multiplex system. The system takes advantage of the Shannon sampling theorem, according to which, if a signal containing no frequency components greater than $f_s$ cycles per second is sampled at a rate not less than $2f_s$ times per second, then the original signal can be reconstructed without error from the samples. In the time sample multiplexing scheme of the present invention the wide band input signal having an upper frequency limit of $f_s$ cycles per second is sampled at intervals of $$\frac{1}{2f_s}$$

seconds. Each sample consists of a pulse whose amplitude is a measure of the amplitude of the input signal at the time the sample was taken. The samples are distributed sequentially among a plurality of parallel recorder channels and recorded on a multi-track magnetic tape or other suitable plural channel recording medium. Upon playback the samples are reproduced and combined in such a way as to reconstruct the original input signal. It is a particular feature of the invention that the samples are so processed before recording, and the time spacing of the samples recorded in each channel is so related to the upper frequency limit of each channel as to minimize cross talk between consecutive samples in each channel and hence provide optimum fidelity and maximum signal-to-noise ratio for the system, while minimizing the number of channels required for a given input signal bandwidth.

A fundamental consideration in the system of the present invention is that consecutive samples recorded in any one tape channel must be spaced sufficiently in time so that they do not interfere with one another. It can be shown that the minimum allowable time spacing between consecutive samples in one channel with no sample-to-sample cross talk is $$\frac{1}{2f_r}$$

seconds, where $f_r$ is the upper frequency limit of the recorder channel. This minimum allowable time spacing is attained, according to the present invention, while minimizing cross talk to the point where it is theoretically zero, by using samples having a repetition rate in each channel of $f_c=2f_r$, and converting each sample to a wave of the form $$\frac{\sin 2\pi f_r t}{2\pi f_r t}$$

Such a waveform is preferably obtained by making the sample pulses narrow, i.e. of low duty factor, and passing the pulses through a filter which is even-ringing, i.e. has an output waveform passing through zero amplitude at regular equal intervals of time $$\frac{1}{2f_r}$$

seconds in length, and which preferably has a substantially flat amplitude and linear phase characteristic over the frequency band from zero to $f_r$. Upon recording and reproduction of the output signals from the filters, substantial duplicates of the original sample pulses are obtained, according to the invention, by resampling the reproduced signal from each channel at times synchronized with the peak amplitude responses of the even-ringing filter for that channel. The samples thus recovered from the several channels are then combined and integrated to yield the original wide band signal.

Figure 1 shows a block diagram of a video recording and reproducing system constructed in accordance with the present invention. To facilitate an understanding of the system, its operation will be explained in connection with the recording and reproducing of a video signal having a bandwidth or frequency spectrum 0 to $f_s$, of 3.4 mcs. It should be understood that this specific bandwidth is exemplary only, the invention being in no sense limited to the handling of any specific bandwidth.

According to Shannon's Theorem, for correct reproduction a 3.4 mc. signal must be sampled at a frequency not less than 6.8 mcs., i.e. at time intervals of 0.147 microsecond. The system uses a recording medium in the form of a magnetic tape 2 having a plurality of channels or tracks, of which all but two are used to record the components of the video signal and the remainder are used for synchronizing and control purposes and to record accompanying audio signals, if any. The bandwidth of each tape channel is $f_r$=189 kc. Since the number of channels required to record the video signal, $n$, equals $$\frac{2f_s}{f_c}$$

and since $f_c=2f_r$, it will be appreciated that $n=f_s/f_r$. In this instance $n$ is therefore eighteen and the total number of tape channels required is twenty. Since the system has eighteen sample channels the recurrence frequncy of the samples in each channel, $f_c$, will be 1/18 of 6.8 megacycles of 378 kilocycles, i.e. a period of 2.65 microseconds. To minimize loss in system frequency response it is preferably to keep the sample pulse width as small as practical, sample pulse widths of the order or 0.1 microsecond being preferred.

The input video signal enters the system through a low pass filter 4 which eliminates frequency components higher than $f_s$, and is then fed through a video amplifier 6 to the eighteen channel multiplexer sampler 8. In the multiplexer sampler the amplitude of the video signal is sampled at intervals of $$\frac{1}{2f_s}$$

seconds and the samples are distributed sequentially among the eighteen recorder channels.

Figure 5:
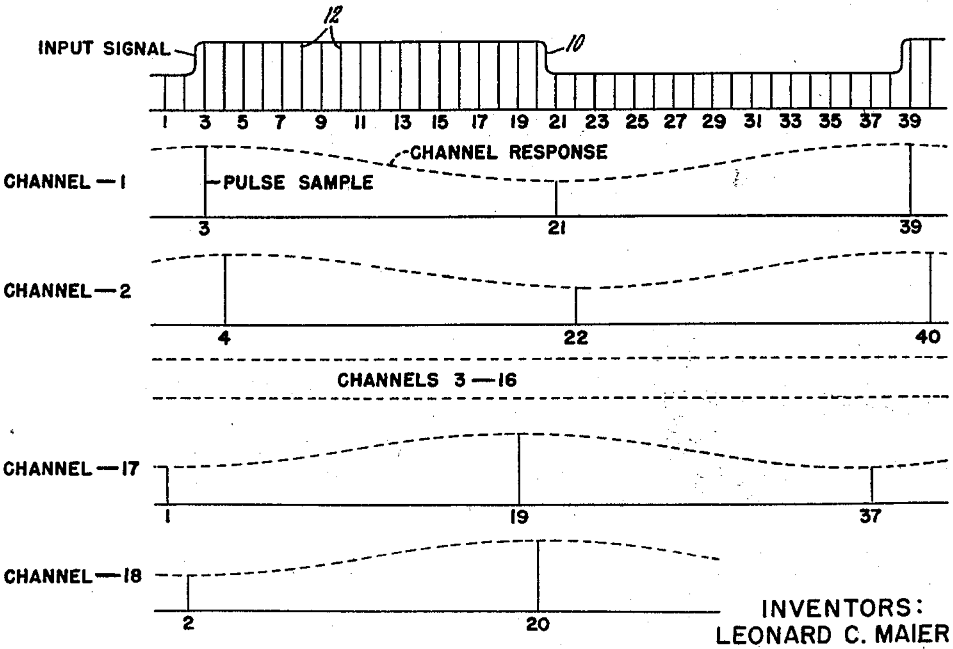
Figure 5 is a graph of additional waveforms in the system.

Figure 5 is a time diagram showing the order in which the successive pulse samples of the video signal are distributed sequentially to the various recorder channels. The video signal is represented by the waveform 10, and 12 represents the successive sample pulses. Channel 1 receives the samples numbered 3, 21, 39, and every 18th pulse thereafter, while channel 2 receives samples 4, 22, 40, and every 18th pulse thereafter. Likewise, channel 17 receives samples 1, 19, 37, etc., and channel 18 receives samples 2, 20, 38, etc. As will be evident from Figure 5, the amplitude of each sample pulse is a measure of the instantaneous amplitude of the video signal at the time the sample was taken.

Figure 2:
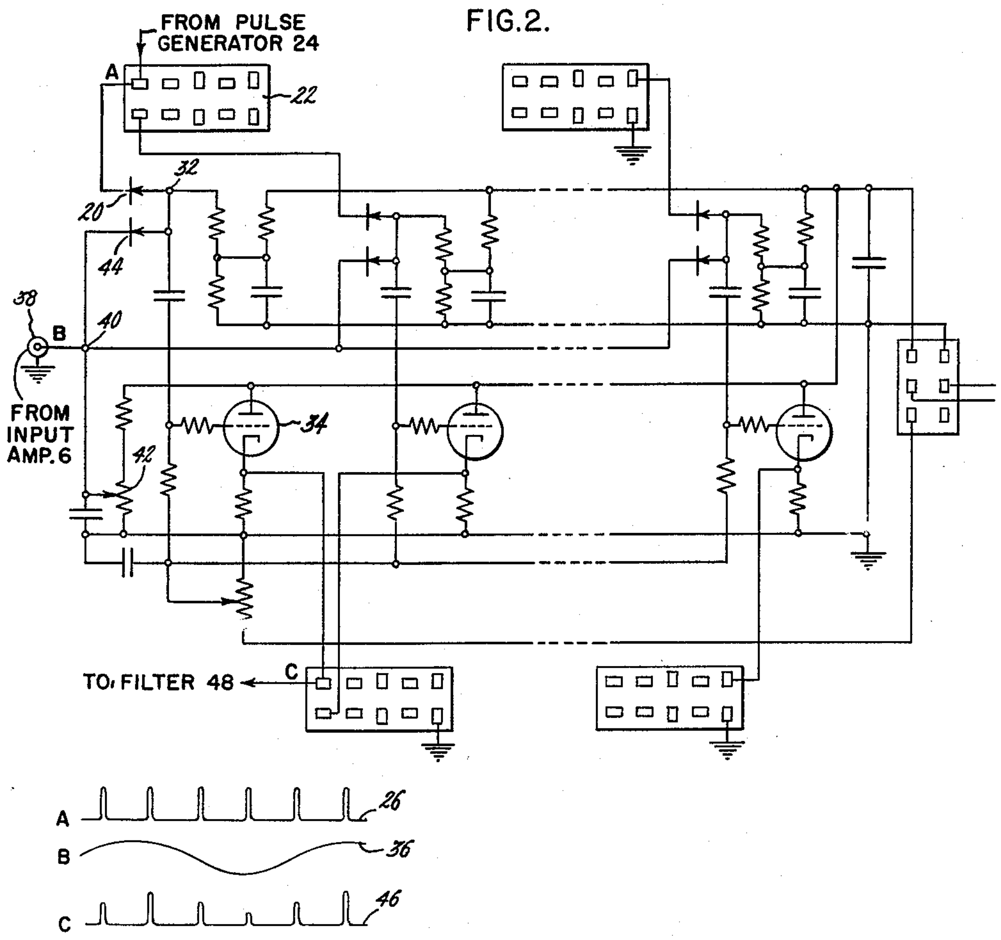
Figure 2 is a schematic diagram of one portion of the system.

The schematic diagram of one channel of the multiplexer sampler is shown in Figure 2. The cathode of the diode 20 receives, from a pulse input terminal at plug 22, pulses from pulse generator 24, Figure 1, having a period of 2.65 microseconds and a duration of 0.1 microsecond, as shown by waveform 26. The timing of these pulses is controlled by a timing wave from a multiplexer synchronizer 28, shown in Figure 1, which is in turn controlled by crystal oscillator 30. The pulse generator 24 provides similar pulses to the other sampler channels, but phased so that there is a 0.147 microsecond delay between pulses to successive samplers. The pulse input terminal at plug 22 has a low D.C. resistance path to ground so that it is held close to ground potential in the absence of a pulse. The plate of diode 20 is connected to point 32, which is capacitively coupled to the grid of cathode follower 34. The video signal from the input amplifier, as shown by waveform 36, is fed through the video input terminal 38 to point 40, which, due to the input coupling network including the bias potentiometer 42, is maintained at a positive potential about which the video signal varies. Point 40 is also connected to the cathode of a diode 44 the plate of which is connected to point 32. When no pulse input is present, point 32 is maintained at a low potential by the conduction of the diode 20, and the diode 44 is cut off since its cathode is more positive than its plate. When a positive pulse is applied to the cathode of diode 20, however, the diode 20 is cut off and the potential of point 32 rises suddenly until it reaches the potential of point 40 where it is clamped by conduction of the diode 44. At the end of the pulse at its cathode, diode 20 again conducts returning the potential of point 32 to its initial low value. Thus a sample pulse is obtained at point 32 which, as shown by waveform 46, is coincident with the pulse from pulse generator 24 and has a height determined by the amplitude of the video signal during the sampling period. The signal developed at point 32 is fed through the cathode follower 34, which is heavily biased to minimize spurious voltage fluctuation at point 32. The sample pulse output of each cathode follower is fed to a corresponding even ringing filter 48, Figure 1.

Figure 3:
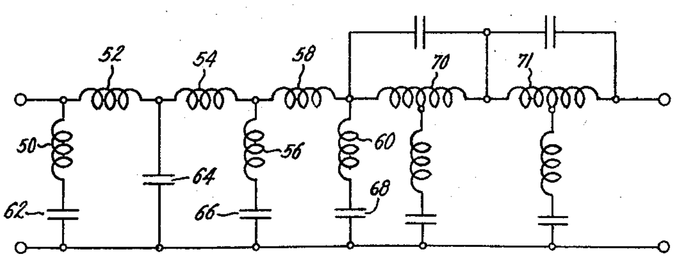
Figure 3 is a schematic diagram of another portion of the system.

Figure 3 is a schematic diagram of one of the even ringing filters 48. The filter is designed to have a substantially flat amplitude and linear phase characteristic between zero and $f_r$, and an even ringing frequency $f_r$. The filter consists of a minimum phase shift attenuation section including inductances 50, 52, 54, 56, 58, 60, and capacitances 62, 64, 66, 68, and two bridged-T phase correcting sections 70, 71. To provide phase and amplitude characteristics which approach as closely as possible to that of the ideal filter, the quality factors of all inductances should preferably be kept high, for example being preferably above fifty at 189 kilocycles per second.

Figure 4:
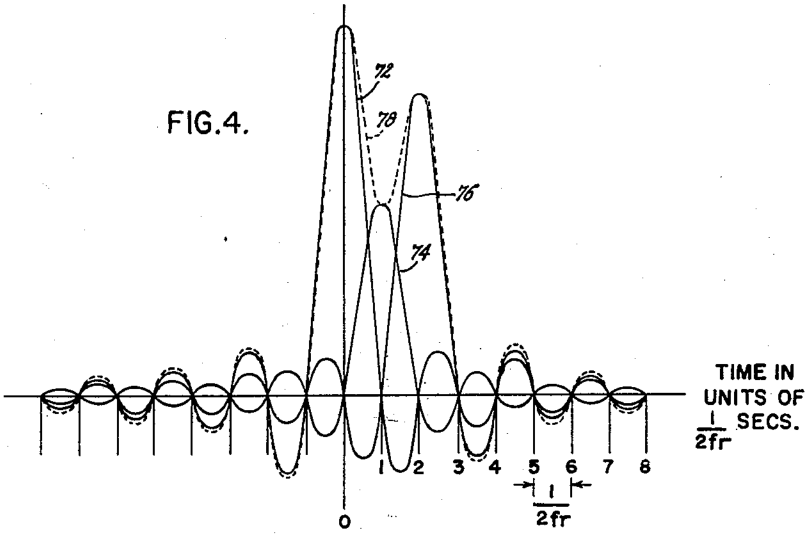
Figure 4 is a graph of the waveforms of certain signals developed in the system.

The impulse response characteristic of the filter to a single narrow pulse is of the form $$\frac{\sin 2\pi f_r t}{2\pi f_r t}$$

and is illustrated by waveform 72 in Figure 4. The unit time scale for this figure has been chosen as $$\frac{1}{2f_r}$$

or 2.65 microseconds, which is the interval between successive sample pulses arriving at the filter from the multiplexer sampler. Choosing zero time arbitrarily as that coinciding with the maximum response at the filter output terminals, it will be observed that the zero crossing points of the waveform 72 correspond to successive 2.65 microsecond intervals before and after zero. The waveform 74 in Figure 4 shows the response of the filter to the next successive sample pulse in the channel, and the waveform 76 illustrates the filter response to the next later pulse. The crest amplitude of each waveform 72, 74, 76 corresponds to the amplitude of the sample pulse which generated it. The waveform 78 shown in dotted lines indicates the composite output waveform of the filter resulting from the application thereto of the train of sample pulses spaced by intervals of $$\frac{1}{2f_r}$$

or 2.65 microseconds.

It will be noted from the relationship of the waveforms 72, 74, and 76 to waveform 78 that at times corresponding to $$t=0, \frac{1}{2f_r}, \frac{2}{2f_r}, \frac{3}{2f_r}$$

etc., the amplitude of the filter output, i.e. waveform 78, is exclusively and uniquely related to the amplitude of respective sample pulses. This is because the filter response to any one sample pulse passes through zero at all but one of the points $$t=0, \frac{1}{2f_r}$$

etc. In accordance with the present invention, the waveform 78 from each filter, containing no frequency components higher than $f_r$, is recorded, reproduced, and resampled at times corresponding to $$t=0, \frac{1}{2f_r}, \frac{2}{2f_r}$$

etc. to yield pulses corresponding in amplitude to the sample pulses which generated waveforms 72, 74, 76, etc.

The output of each even ringing filter 48 is connected to multichannel amplifier 80, each channel of which includes a time delay equalization network (not shown) capable of introducing a delay sufficient to compensate for small differences between the filters 48 in the time required to achieve maximum response after the application of a pulse signal. These time delay correction networks also compensate for other inter-channel transmission time differences so that the overall transmission time for all the channels is the same. The output signals from the amplifier 80 are then further amplified to a level suitable for recording by the record amplifiers 82 and supplied to the multichannel recording head 84 for recording on the inner eighteen tracks of the twenty track magnetic tape 2.

The two outside tracks of the tape are reserved for control and synchronization signals and for any audio intelligence which it is desired to record with the video, such as for example the sound signal associated with a television video signal. The audio signal is applied to channel 1 in the form of frequency modulation of a carrier generated by oscillator 86. The carrier is utilized to avoid the poor low frequency response of the tape at speeds necessary to record the filter output signals. For the purpose of synchronizing the demultiplexing operation, a timing signal having a frequency less than $f_r$ and equal to a subharmonic of $f_s$ is supplied by the multiplexer synchronizer 28 and recorded in track 20 with its phase adjusted so that it goes through 0 at the time that one channel should be sampled. For the purpose of minimizing inter-channel timing errors due to skewing of the tape relative to the record and playback heads, the multiplexer synchronizer 28 also supplies a low frequency control signal which is recorded with a 90° phase separation in tracks 1 and 20, and upon reproduction is used to servo control the angular position of the playback heads.

Upon reproduction, the signals from all the tracks of the tape are amplified in the playback amplifier 88. From the playback amplifier the timing, servo control, and audio signals are fed to amplifier filter 90 wherein the audio signal is separated and fed to the FM receiver 92. The timing signal is fed to a demultiplexer synchronizer 94 where it is utilized to derive a synchronizing signal for controlling the timing of the demultiplexer pulse generator 96. The low frequency control signals from the two outside channels are recovered in the filter amplifier 90 and fed to a phase detector 98 wherein they are used to generate a skew error signal permitting servo control of the angular position of the playback head relative to the tape.

The phase detector 98 is arranged to provide a null output if the two input signals have a 90° phase difference. Since the two control signals were originally recorded with a 90° phase difference, a 90° phase difference at the phase detector will provide an indication that the playback head is properly aligned with the tape and there is no skew. If the playback head is skewed relative to the tape, the control signals will have a phase difference other than 90°, the deviation from 90° depending upon the magnitude of the skew error and the polarity of the deviation depending upon the direction of the skew error. Accordingly, the output of the phase detector will be a voltage whose polarity and magnitude are proportional to the skew of the playback head. The output of the phase detector is amplified in D.C. pre-amplifier 100 and amplifier 102 and fed to an electromagnetic driving device 104 which is mechanically attached to the playback head so as to rotate the head relative to the tape in such a direction as to eliminate the skew error. Such a skew control servo system is the subject of a separate patent application in the names of Samuel M. Garber, Jr., Thomas T. True, and Benjamin G. Walker, filed February 13, 1956, Serial Number 565,062, to which reference is made for a more complete disclosure.

The 189 kilocycle signals recovered from channels 2 through 19 of the playback amplifier are further amplified in multichannel amplifier 106 and fed to the demultiplexer sampler and adder 108. The sampling circuits used in the demultiplexer sampler are essentially the same as those used in the multiplexer sampler 8 heretofore described. Timing of the sampling in the demultiplexer is precisely controlled by the pulses from the pulse generator 96 which is in turn timed by the synchronized signal output of the demultiplexer synchronizer 94. This insures that the signal arriving at each channel of the demultiplexer sampler will be sampled at intervals of $$\frac{1}{2f_r}$$

second and at times corresponding to its amplitude peaks, i.e. times corresponding to $$t=0, \frac{1}{2f_r}, \frac{2}{2f_r}$$

etc. as shown in Figure 4. In this way the amplitude of successive sample pulses derived in each channel of the demultiplexer sampler is related exclusively to the amplitude of the corresponding sample pulses applied to the even ringing filter 48 for that channel, and intersample crosstalk is substantially eliminated.

The individual channel samplers are connected to a common load which serves as the adder. The output signal appearing across the load thus consists of the sum of the samples from all the channels. From the adder the composite pulse train is passed through the low pass filter 110 having an upper cutoff frequency of 3.4 megacycles, which integrates the samples and yields the reconstructed video signal. The output of the low pass filter is connected to a final video amplifier 112. If necessary the video amplifier 112 may include a D.C. restorer for restoring low frequency signal components which may have been attenuated or lost in the recording and reproducing process.

Thus there has been shown and described a wide band signal recording and reproducing system in which time sample multiplexing is used to record the signal on a plurality of magnetic tape channels at tape speeds which are practical and readily attainable. The system is capable of achieving good frequency response and good signal-to-noise ratio, while requiring a minimum number of recorder channels for a given input signal bandwidth yet substantially eliminating cross-talk between samples in each channel.

It will be appreciated by those skilled in the art that the invention may be carried out in various ways and may take various forms and embodiments other than those illustrative embodiments heretofore described. It is to be understood therefore that the scope of the invention is not limited by the details of the foregoing description, but will be defined in the following claim.

What we claim as new and desire to secure by Letters Patent of the United States is:

Apparatus for recording and reproducing a wide band signal comprising, means for removing frequency components above the highest desired frequency component, $f_s$, of the wide band signal, sampling means for deriving amplitude sample pulses of the remaining wide band signal at a frequency not less than twice that of the highest desired frequency component, $f_s$, a plurality, $n$, of recording channels, means for distributing the sample pulses sequentially among the recording channels wherein the pulse repetition frequency of each recording channel is $$f_c=\frac{2f_s}{n}$$

even-ringing filter means in each channel having substantially flat amplitude and linear phase characteristics over the frequency band from zero to $f_r$ where $$f_r=\frac{f_c}{2}$$

means for applying the pulse samples in each channel to the respective filter means to generate from successive sample pulses therein wave signals having a peak amplitude corresponding to the amplitude of the respective sampling pulse, a plurality, *n*, of channel signal storage means for recording the derived wave signals, a plural channel reproducer for recovering the recorded signals, means synchronized with the sampling means for rederiving amplitude samples from the recovered signals at times corresponding to the amplitude peaks thereof, means for confining the rederived samples in sequence to form a composite sample train, and an integrator for reconstituting the original wide band signal from the composite sample train.

References Cited in the file of this patent

UNITED STATES PATENTS

| | | |
|---|---|---|
| 2,517,808 | Sziklai | Aug. 8, 1950 |
| 2,664,462 | Bedford | Dec. 29, 1953 |
| 2,694,748 | Johnson | Nov. 16, 1954 |
| 2,695,331 | Johnson | Nov. 23, 1954 |

OTHER REFERENCES

Tele-Tech and Electronic Industries, May 1954, pages 77, 127, 128, 129.